United States Patent

Canada et al.

[11] Patent Number: 5,907,491
[45] Date of Patent: May 25, 1999

[54] WIRELESS MACHINE MONITORING AND COMMUNICATION SYSTEM

[75] Inventors: Ronald G. Canada; James C. Robinson; Zbigniew Czyzewski, all of Knoxville; James W. Pearce, Lenoir City, all of Tenn.

[73] Assignee: CSI Technology, Inc., Wilmington, Del.

[21] Appl. No.: 08/835,083

[22] Filed: Apr. 4, 1997

Related U.S. Application Data

[63] Continuation-in-part of application No. 08/697,372, Aug. 23, 1996, Pat. No. 5,854,994.

[51] Int. Cl.⁶ .............................. G06F 11/00; G05B 23/02
[52] U.S. Cl. .............................. 364/468.15; 364/468.16; 364/468.17; 364/474.16; 364/551.02; 340/825.06; 340/825.08
[58] Field of Search .................... 364/468.15, 468.16, 364/468.17, 474.16, 551.01, 551.02, 552; 340/825.06, 825.07, 825.08, 825.22, 825.23; 370/77, 85.1, 85.7, 85.8

[56] References Cited

U.S. PATENT DOCUMENTS

| | | | |
|---|---|---|---|
| 4,237,454 | 12/1980 | Meyer | 340/682 |
| 4,470,141 | 9/1984 | Takada | 370/324 |
| 4,559,828 | 12/1985 | Liszka | 73/658 |
| 4,720,806 | 1/1988 | Schippers et al. | 364/551 |
| 4,722,226 | 2/1988 | Edmonds | 73/660 |
| 4,766,548 | 8/1988 | Cedrone et al. | 364/479 |
| 4,831,785 | 5/1989 | Sigg | 451/1 |
| 4,866,422 | 9/1989 | Dunnott et al. | 340/539 |
| 4,885,707 | 12/1989 | Nichol et al. | 364/551.01 |
| 4,887,266 | 12/1989 | Neve et al. | 370/349 |
| 5,025,486 | 6/1991 | Klughart | 455/54 |
| 5,046,066 | 9/1991 | Messenger | 370/94.1 |
| 5,101,406 | 3/1992 | Meyinger | 370/349 |
| 5,295,154 | 3/1994 | Meier et al. | 375/200 |
| 5,377,922 | 1/1995 | Fredrikkson et al. | 242/364.8 |
| 5,400,246 | 3/1995 | Wilson et al. | 364/146 |
| 5,408,506 | 4/1995 | Minchu et al. | 375/356 |
| 5,438,329 | 8/1995 | Gastorniotis et al. | 340/870.02 |
| 5,488,631 | 1/1996 | Gold et al. | 375/206 |
| 5,504,746 | 4/1996 | Meier | 370/256 |
| 5,528,219 | 6/1996 | Frohlich et al. | 340/540 |
| 5,570,367 | 10/1996 | Aganoglu et al. | 370/94.1 |
| 5,602,749 | 2/1997 | Nosburgh | 364/474.16 |
| 5,608,643 | 3/1997 | Wichter et al. | 364/479.14 |

FOREIGN PATENT DOCUMENTS

| | | |
|---|---|---|
| 5191909 | 7/1993 | Japan . |
| 2197473 | 5/1988 | United Kingdom . |
| 2271691 | 4/1994 | United Kingdom . |

*Primary Examiner*—Paul P. Gordon
*Attorney, Agent, or Firm*—Luedeka, Neely & Graham, PC

[57] ABSTRACT

A wireless machine monitoring and communication system includes one or more machine monitors which attach to one or more machines to sense a physical characteristic of the machine, such as vibration or temperature, and to produce wireless transmissions corresponding to the sensed characteristic. A command station executes machine status polling in accordance with a time-division communication protocol and processes machine status data obtained during polling to determine the status of the machine. The machine monitor incorporates a wireless transmitter for transmitting at least status information, and the command station incorporates a wireless receiver for receiving monitor transmissions. To conserve power, the machine monitors are turned on only at preprogrammed times in accordance with the time-division communication protocol. Each machine monitor includes a receiver and the command station includes a transmitter to enable the command station to send commands to each machine monitor. A microcomputer in each monitor analyzes sensor data and a memory stores the analyzed sensor data. Repeaters are employed as necessary to assist in propagating wireless transmissions throughout the system. A tachometer sensor is employed at each machine to provide monitors and sensors with information relating to machine speed. A computer network is connected to the command station for transferring data and for controlling the overall operation of the system.

58 Claims, 10 Drawing Sheets

WIRELESS MACHINE MONITORING AND COMMUNICATION SYSTEM

TECHNICAL FIELD

This is a continuation in part of pending application Ser. No. 08/697,372 filed Aug. 23, 1996, now U.S. Pat. No. 5,854,994 issued Dec. 29, 1998, and entitled VIBRATION MONITOR AND TRANSMISSION SYSTEM.

The present invention relates to an apparatus for the nonintrusive monitoring of one or more physical characteristics associated with a machine. More particularly, it relates to an apparatus for transmitting a wireless signal representing the monitored machine characteristics from one or more sensors to a remote monitoring station.

BACKGROUND

Many manufacturing processes require complex industrial machines utilizing rotating or reciprocating elements. The efficient operation and maintenance of these machines as essential to maximizing production and minimizing downtime. When a rotating machine element acquires a defect, that defect is seldom catastrophic at onset. Instead, the defect is usually of a latent or incipient nature, such as a hairline fracture in the tooth of a gear. Notwithstanding a probable reduction in the efficiency of the machine, if such a fault is not detected, isolated, and repaired, it could grow into a catastrophic failure of the machine with resultant loss of production capacity of the machine and possible injury to personnel. Unfortunately, due to the noise generated by these machines and the acoustic environment in which they normally operate, it is often difficult if not impossible to detect latent or even incipient defects in rotating elements of the machine by visual or aural inspection. Further complicating the detection of such faults is that faulty components may be hidden from view, such as a single gear in an enclosed gearbox.

It is desirable to detect and locate faults while the machine is operating in its normal environment so as not to interfere with the production process. Taking the machine off line to perform preventative maintenance creates an undesirable and inefficient situation, requiring a back-up or redundant machine in order to prevent a shutdown of the production process.

Nonintrusive fault detection may be accomplished by monitoring certain physical characteristics of the machine, such as vibration and temperature levels, using electrical sensors such as accelerometers and temperature sensors. These sensors are typically connected by means of at least one pair of wires per sensor to a monitoring device. The monitoring device processes the sensor signals and produces an output signal which is indicative of the operational health of the machine. Such fault detection devices provide an early indication of machine problems, typically before a catastrophic failure occurs.

One problem associated with wired fault detection systems is the high cost of installation in a typical manufacturing plant. A typical machine may require four to eight vibration sensors mounted at various locations on the machine, and there may be from several dozen to several hundred machines in a typical plant. It is desirable to monitor all of the machines from a central location in the plant, so that manufacturing personnel need not travel to each machine in the plant to assess its health. The installation of wire and conduits to connect each sensor to a central monitoring station could be cost prohibitive.

In addition to installation problems, wired systems are difficult and costly to maintain. Such systems tend to be fragile, primarily due to the wiring. Wires and connectors can easily become contaminated with water or other materials common in dirty industrial environments, resulting in anomalous signals and other failure conditions. Wires are also easily damaged, especially near the connectors, during normal machine maintenance procedures. Such damage is usually manifested as intermittent anomalous signals, which make isolation, diagnosis, and correction of the problem quite difficult.

Wired machine monitoring systems are also inflexible once installed. It is difficult to change the configuration of the system as needs change within the manufacturing plant. If a plant operator decides that more sensors should be added to a machine, or that the location of the machine or sensors should be changed, the cost and difficulties associated with installing additional wiring and conduits must be endured.

Since the major problems associated with wired machine monitoring systems are caused by the presence of the wires, a need exists for a wireless machine monitoring system.

SUMMARY

The need for a wireless machine monitoring system is satisfied with a communication system in accordance with the present invention. A preferred embodiment of the communication system enables one to monitor the status of a machine and to communicate the machine's status through wireless signals. The system includes a plurality of machine monitors positioned to monitor operational characteristics of a machine. Each monitor includes a receiver for receiving wireless command signals, at least one sensor for sensing a characteristic of the machine, a data processor for receiving and processing sensor signals to produce status data, a transmitter for transmitting wireless status signals corresponding to the status of the machine as represented by status data, and an electrical power source for powering the monitor. A command station, which includes a transceiver, is also provided to transmit wireless command signals and to receive status data through the wireless status signals.

The wireless status signals can be transmitted in accordance with a variety of communication protocols. In one embodiment, wireless status signals are transmitted by machine monitors according to a time-division communication protocol. In another embodiment, a non-time division communication protocol is employed. In either case, the communication protocol can be programmed into the monitor before, during, or after installation. In addition to those functions performed according to the communication protocol, monitors may be requested by the command station to perform special data sensing, analysis, and transmission functions.

Data produced by monitor sensors can be used to determine when an alarm condition exists. For example, a vibration sensor can be used for sensing vibrations generated by the machine. Vibration signals output by the vibration sensor and received by the monitor data processor are transformed to the frequency domain by way of Fourier transform, producing a frequency spectrum. The frequency domain data is compared to predetermined criteria, and an alarm condition is determined to exist when the frequency domain data meets the predetermined criteria.

Another type of sensor that can be employed is a tachometer sensor which senses machine revolutions and produces corresponding tachometer signals. The tachometer sensor includes a transmitter which transmits a wireless tachometer signal corresponding to sensed machine revolutions. The monitor is programmed to correlate frequency domain data with machine revolution data to produce status data. Monitors may also be programmed to be selectively energized and de-energized according to machine revolution information contained in the tachometer signals.

In another preferred embodiment, each machine monitor in the wireless machine monitoring system includes at least one sensor which senses a parameter of the machine and produces digital data, a wireless transmitter and receiver, and a data processor for controlling the operation of the sensor, transmitter and receiver. The monitor data processor receives and processes the digital sensor data according to a first processing configuration for communicating the digital data to the transmitter and causing the transmitter to produce transmission signals corresponding to the digital data. The command station includes a receiver and associated circuitry for producing received digital data, and a data processor for controlling and causing the receiver and associated circuitry to receive a transmission signal and produce received digital data corresponding to the transmission signal. The system also includes means for reprogramming the monitor data processor to change the programmed processing configuration, enabling reconfiguration of the machine monitor so that data is processed according to a second processing configuration.

A hand-held configuration device can be used for reprogramming the monitor data processor. Alternatively, reprogramming is accomplished by the command station.

The configuration device includes a wireless transmitter and receiver, and a data processor for controlling and causing the transmitter to transmit configuration signals to the monitor for reprogramming of the monitor data processor and for processing wireless signals transmitted by the monitor. A user interface is also provided for inputting user commands to the configuration device data processor to control reprogramming of machine monitors.

In another preferred embodiment, the invention provides a method of determining and communicating the status of a machine. The method includes the steps of programming a plurality of machine monitors in accordance with a communication protocol. Wireless command signals are transmitted from a command station to the monitors according to the communication protocol. A characteristic of the machine being monitored is sensed in accordance with the communication protocol, producing sensor signals. The signals are processed to produce machine status data which is transmitted wirelessly to the command station in accordance with the time-division communication protocol.

Another preferred method provides for periodically polling a plurality of machine monitors for machine status data in accordance with an established communication protocol. This method includes the steps of defining a time-division schedule of events to occur during a periodic polling sequence. Schedule events include transmitting wireless command signals from a command station to other communication devices including machine monitors, receiving wireless command signals by the machine monitors, sensing one or more characteristics of the machine to produce sensor signals, processing the sensor signals to produce machine status signals, and transmitting wireless status signals to the command station. Each device is assigned a time slice within the time-division schedule during which the device powers up to receive and execute commands communicated by the command signals. The machine monitors are polled in accordance with the time-division schedule to determine the status of the machine.

BRIEF DESCRIPTION OF THE DRAWINGS

A preferred embodiment of the invention will now be described in further detail. Other features, aspects, and advantages of the present invention will become better understood with regard to the following description, appended claims, and accompanying drawings where:

DETAILED DESCRIPTION OF PREFERRED EMBODIMENTS

Figure 1:
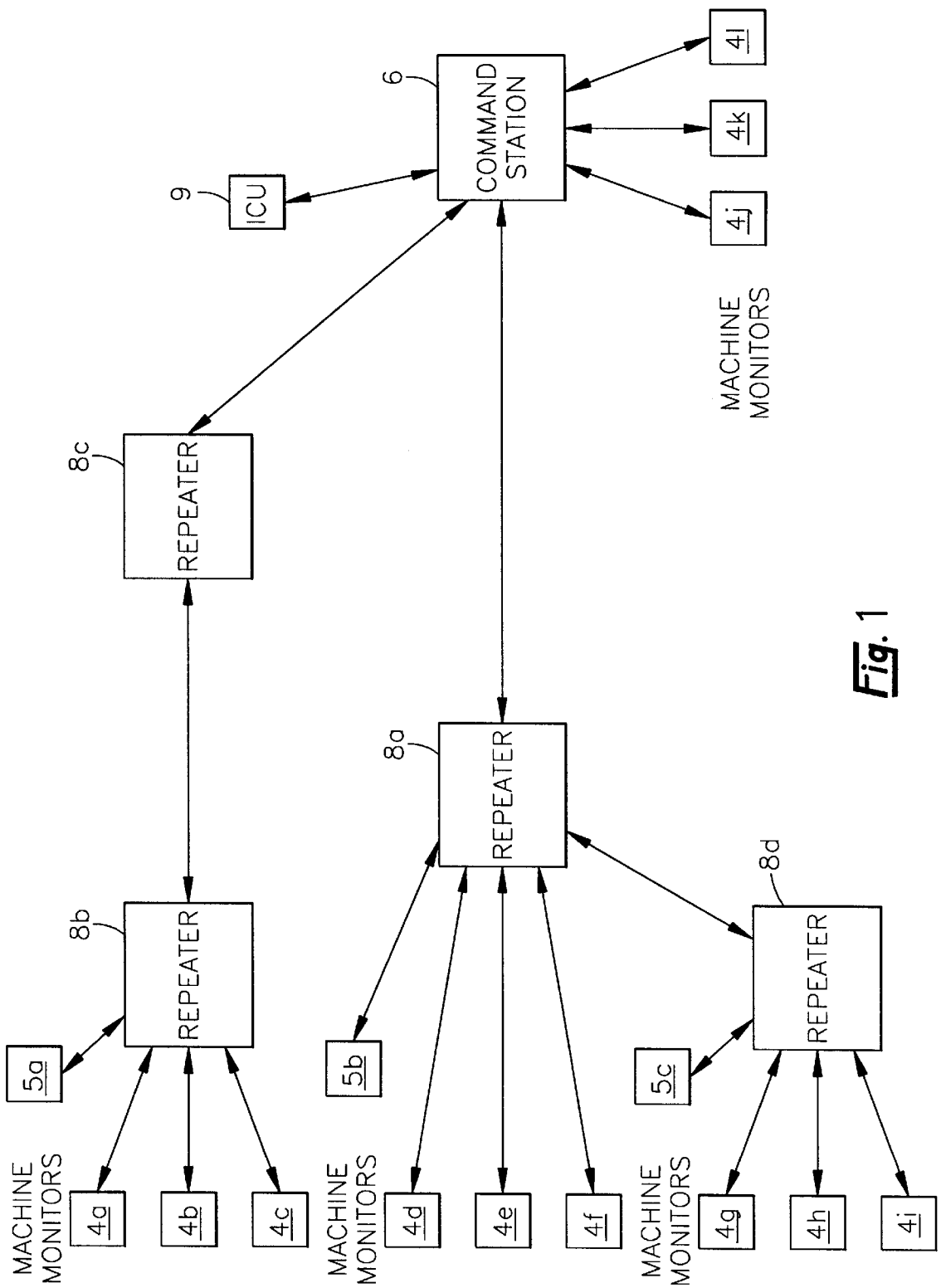
FIG. 1 shows a block diagram of a preferred embodiment of the invention.

In accordance with a preferred embodiment of the present invention, a block diagram of a wireless monitoring system is shown in FIG. 1. The system shown in FIG. 1 is used when it is desirable to remotely monitor certain machine characteristics, but it is undesirable to install wiring between a monitoring station and a sensor on the machine. More specifically, the system is employed to monitor physical characteristics, such as speed, vibration, flux or other electromagnetic characteristics, temperature, and pressure, of machines and processes, such as those in a manufacturing plant. The basic components of the system include: (1) one or more machine monitors 4 which are placed in various locations on, or in, one or more machines and which transmit wireless signals containing status data representative of the status of the machine and the status of the monitor, the machine status data being representative of machine characteristics such as vibration, electromagnetic energy, and temperature, the monitor status data being representative of monitor characteristics such as the condition of the monitor's battery, circuitry, and sensors; (2) a command station 6 which transmits commands and information to the machine monitors 4, receives data transmitted from the machine monitors 4, and formats the data as desired by an operator; and (3) one or more repeaters 8 as needed to facilitate communication between the machine monitors 4 and the command station 6, especially when site conditions make such aid necessary.

The basic components of the system may be configured in various ways, some of which are illustrated in FIG. 1, to meet the requirements of the particular location where the system is used. If a particular machine is located such that machine monitors 4 placed on the machine are beyond the receiving range of the command station 6, or are out of the line of sight to the command station 6, a properly located repeater 8 is used to receive the signals from the machine monitors 4 and retransmit the signals to the command station 6. In some situations, more than one repeater 8 is necessary to provide for communication between the machine monitors 4 and the command station 6. In other situations, direct communication between the command station 6 and the machine monitors 4 is possible without the use of a repeater 8.

Figure 2:
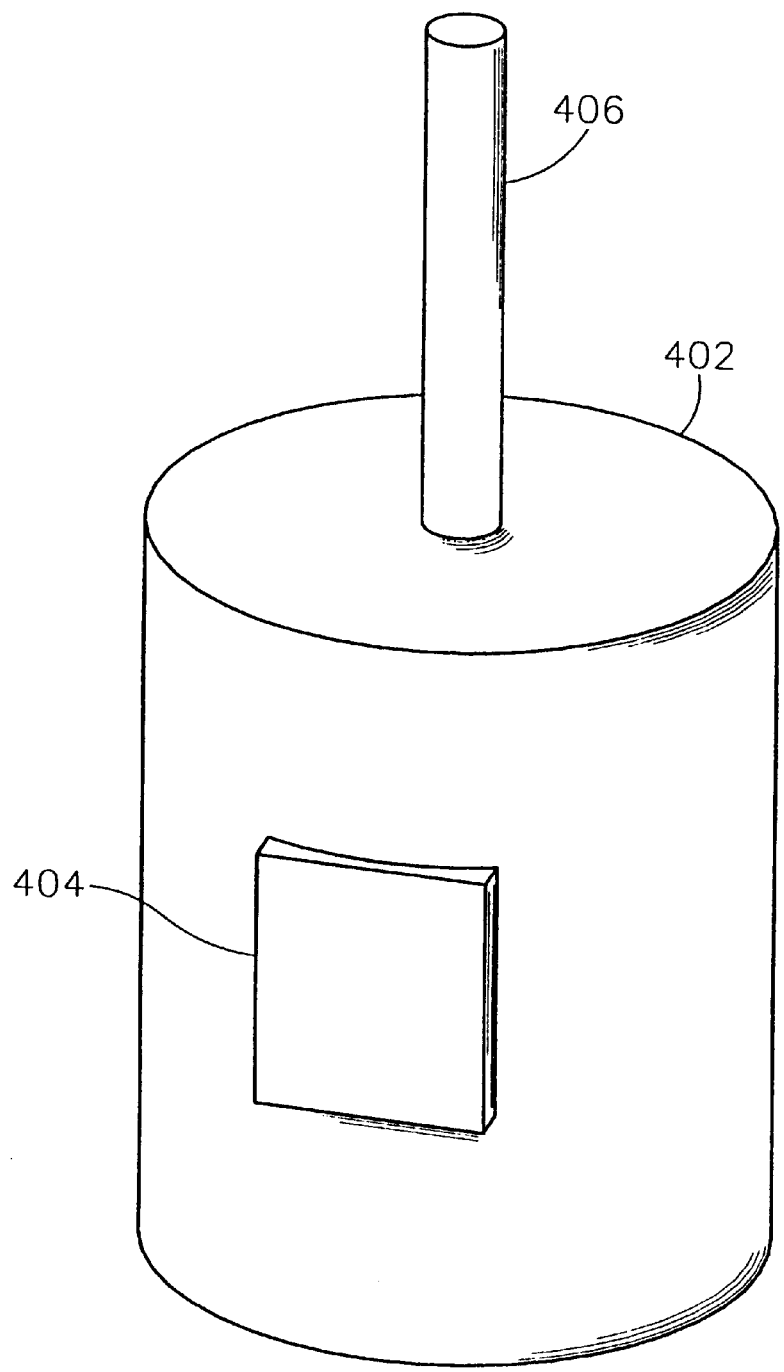
FIG. 2 is a drawing of the machine monitor element of a preferred embodiment of the invention.

As shown in FIG. 2, the machine monitor 4 of FIG. 1 is contained in a compact housing 402, such as a two-inch diameter by three-inch long cylinder with self-contained attachment means 404, such as a magnetic mount, so that the monitor may be easily attached to the machine even in cramped locations. As shown in FIG. 2, an antenna 406 is preferably integrated with the housing 402.

Figure 3:
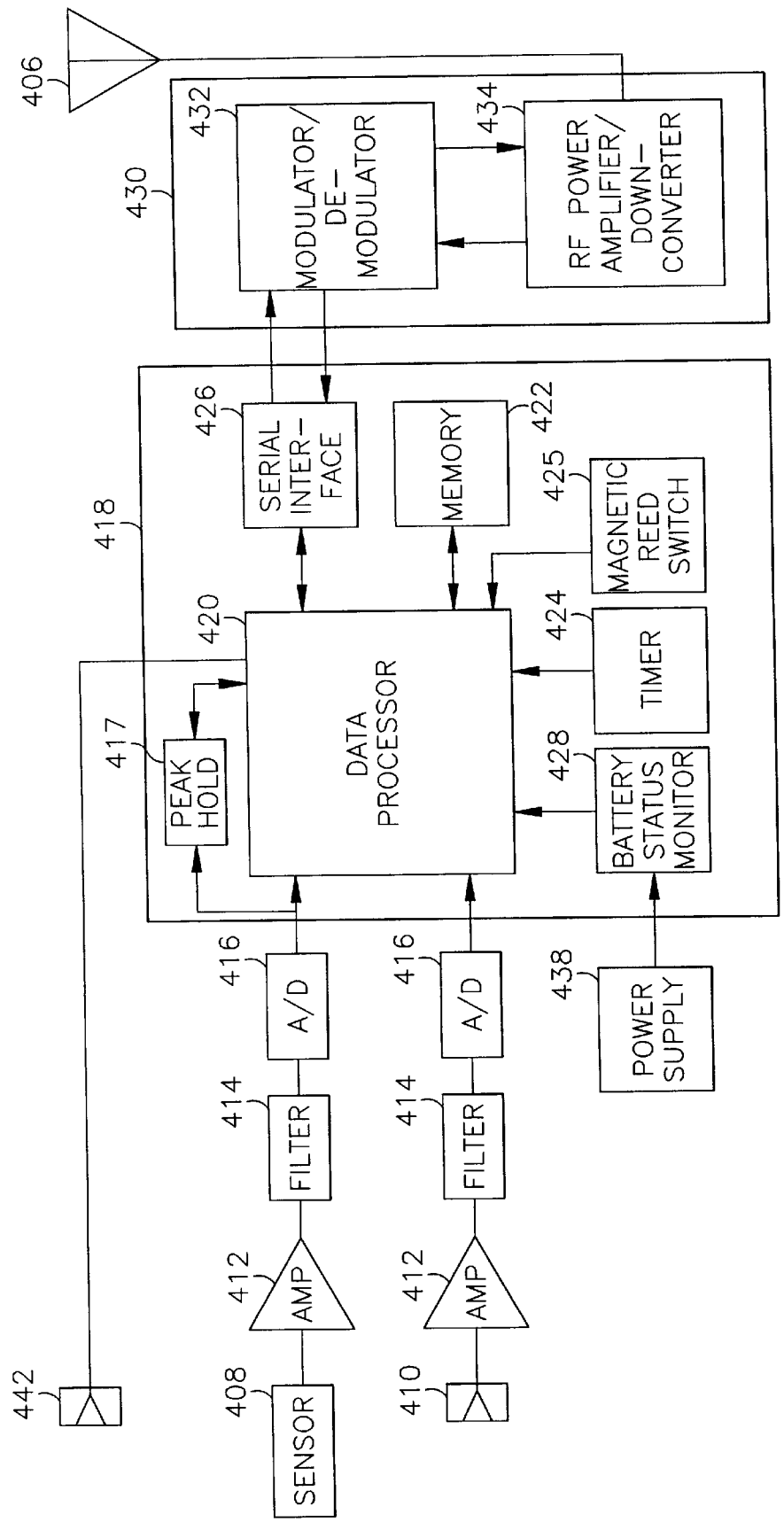
FIG. 3 shows a block diagram of the machine monitor element of a preferred embodiment of the invention.

In FIG. 3, a functional block diagram of the machine monitor 4 of FIG. 1 is shown. Each machine monitor 4 contains at least one sensor 408 which is integrated with the machine monitor housing in such a manner that the desired machine characteristic is accurately measured when the machine monitor housing is fastened to the machine. Preferably, there are a plurality of sensors 408, such as a flux sensor, two temperature sensors, an RF sensor, and two vibration sensors. The machine monitor 4 has connectors 410 so that one or more sensors 408 may be interfaced with the data processing and transmission circuitry of the machine monitor 4. In this manner, the characteristics of interest may be measured at several locations on the machine and then transmitted from only one machine monitor 4. The integrated and remote sensors 408 are devices such as small, low-power, low-cost accelerometers, and instantaneous turn-on solid-state temperature sensors. The accelerometers, such as the type number 353B18, have an accuracy of ±5% from 1 to 10000 Hz and ±3 dB up to 30 kHz, and a turn-on settling time of less than five seconds. The temperature sensors, such as the type number LM60, have an accuracy of ±2° C. over a 0 to 80° C. temperature range.

The sensor signals are amplified by an amplifier 412, such as a digitally-controlled variable gain amplifier incorporating a chip of type number LM6684. The sensor signals are filtered to eliminate aliasing by means of an anti-aliasing filter 414, such as a simple resistorcapacitor (RC) low-pass filter or a two-pole Sallen-Key active filter, and are then converted into digital format by an analog-to-digital converter 416, such as a 16-bit Sigma-Delta converter of type number CS5330.

The digital sensor signals are fed to a monitor computer 418, such as the Toshiba TMP93CM41 microcomputer. Examples of circuits incorporating this microcomputer are detailed in the Toshiba 16-Bit Microcontroller TLCS-900/L MCU Series (2) Data Book (March 1995). The monitor computer 418 includes a data processor 420 which performs 16-bit operations with 32-bit extended registers. The monitor computer 418 also incorporates a memory 422 consisting of at least 32 kilobytes of static RAM, a timer 424, a serial interface 426, and a battery status monitor circuit 428. The monitor 4 also includes an internal self-test capability for the electronics and sensors to determine the monitor's own status, which can be transmitted by the monitor 4 to the command station 6 as status data.

With continued reference to FIG. 3, a power supply 438, such as a replaceable "D-cell" flashlight battery provides the electrical power necessary for the functioning of the active elements of the machine monitor 4. Under normal operational conditions, such a battery will provide power for the machine monitor 4 for at least one year. The power supply 438 may alternatively consist of a rechargeable battery, such as a nickel-cadmium cell, and a charging voltage source, such as a solar cell or a wire coil moving across a magnetic field produced by the machine on which the machine monitor 4 is attached. The battery voltage is monitored by a battery status monitor circuit 428 which provides a battery status message to the monitor computer 418. The monitor computer 418 is programmed to transmit this battery status message to the command station 6 as status data, and to transmit a battery status alert message when the battery voltage falls below a programmed threshold level.

While battery power conservation is an important consideration in a wireless monitoring system, it is anticipated that advances in power source technology could reduce or eliminate the importance of power conservation.

In a preferred embodiment, the sensors 408 are not continuously on, but are turned on by the monitor 4 at intervals which have been programmed into the monitor computer 418. The duration of the measurement interval, during which the sensors 408 are on, is preferably about three seconds, just long enough for the sensors 408 to settle and take a measurement. The frequency of the measurement interval is selectable by the operator and can vary substantially depending on needs, including the need to conserve battery power.

To conserve power and extend battery life, the monitor computer 418 remains in a standby mode for a majority of the time in the preferred embodiment, requiring less than 100 $\mu$A of current, and becomes active only at scheduled times as determined by an established communication protocol. For example, in accordance with a preferred time-division communication protocol, the timer 424, which is the monitor computer's only active component while in standby mode, causes the data processor 420 to enter an operational mode and begin processing data from the sensors 408 at scheduled times. The data processing tasks include such functions as (1) production of time wave form vibration data corresponding to the sensor signals (which may include selectable peak hold vibration signal processing with associated peak hold circuitry 417 similar to that disclosed in co-pending U.S. application Ser. No. 08/555,296, filed Nov. 8, 1995, the entire contents of which is expressly incorporated herein by reference), (2) calculation of fast Fourier transforms (FFT's) on the time-domain sensor data to produce frequency-domain data, (3) comparison of the analyzed sensor data to preprogrammed threshold criteria, (4) production of an alarm message if the threshold criteria is met, (5) band-pass filtering similar to that disclosed in co-pending U.S. application Ser. No. 08/355,208, filed Dec. 9, 1994, the entire contents of which is expressly incorporated herein by reference, and (6) zoom processing similar to that disclosed in the above-referenced co-pending U.S. application Ser. No. 08/355,208. Depending on its programmable instructions, the data processor 420 either sends the processed data over the serial interface 426 to be immediately transmitted, or stores the data in memory 422 for transmission at a later time.

In a preferred embodiment, machines are fitted with tachometer sensors 5a–c. A tachometer 5a–c is preferably grouped with other monitors 4 which are attached to the same machine and which are slaved to the same repeater 8, as illustrated in FIG. 1. The tachometers 5a–c function to assist vibration sensors 408 associated with the monitors 4 by measuring machine RPM and providing RPM data to the monitors 4 so that vibration measurements can be correlated with "current" RPM.

At least two types of tachometers 5a–c may be employed. One type of tachometer 5a–c senses whether the machine is running. If the tachometer data indicates that the machine is off, then all monitors 4 associated with that machine conserve battery power by not taking sensor measurements, such as vibration measurements. The tachometer 5a–c includes an RPM value in its status response to the repeater 8, and the repeater 8 includes the reported RPM in its status poll message to all vibration sensors and monitors 4 which need it. Another type of tachometer 5a–c transmits a tachometer pulse indicating the start of each revolution of the machine. This tachometer pulse is immediately relayed to the vibration sensors and monitors 4 by way of the repeater 8.

In a preferred embodiment, a communication protocol (hereinafter referred to as a time-division communication protocol) is employed for conducting a periodic (preferably once every 60 seconds) status poll of the monitors 4. The protocol involves the use of a time slice schedule or status poll, such as the time slice schedule 18 shown in FIG. 9, where each repeater 8, monitor 4, and sensor, such as a tachometer 5, is allowed to transmit and in some cases receive in a manner that reduces or eliminates the likelihood of interference from two or more devices transmitting at the same time. During each status poll, all devices are resynchronized.

Figure 8:
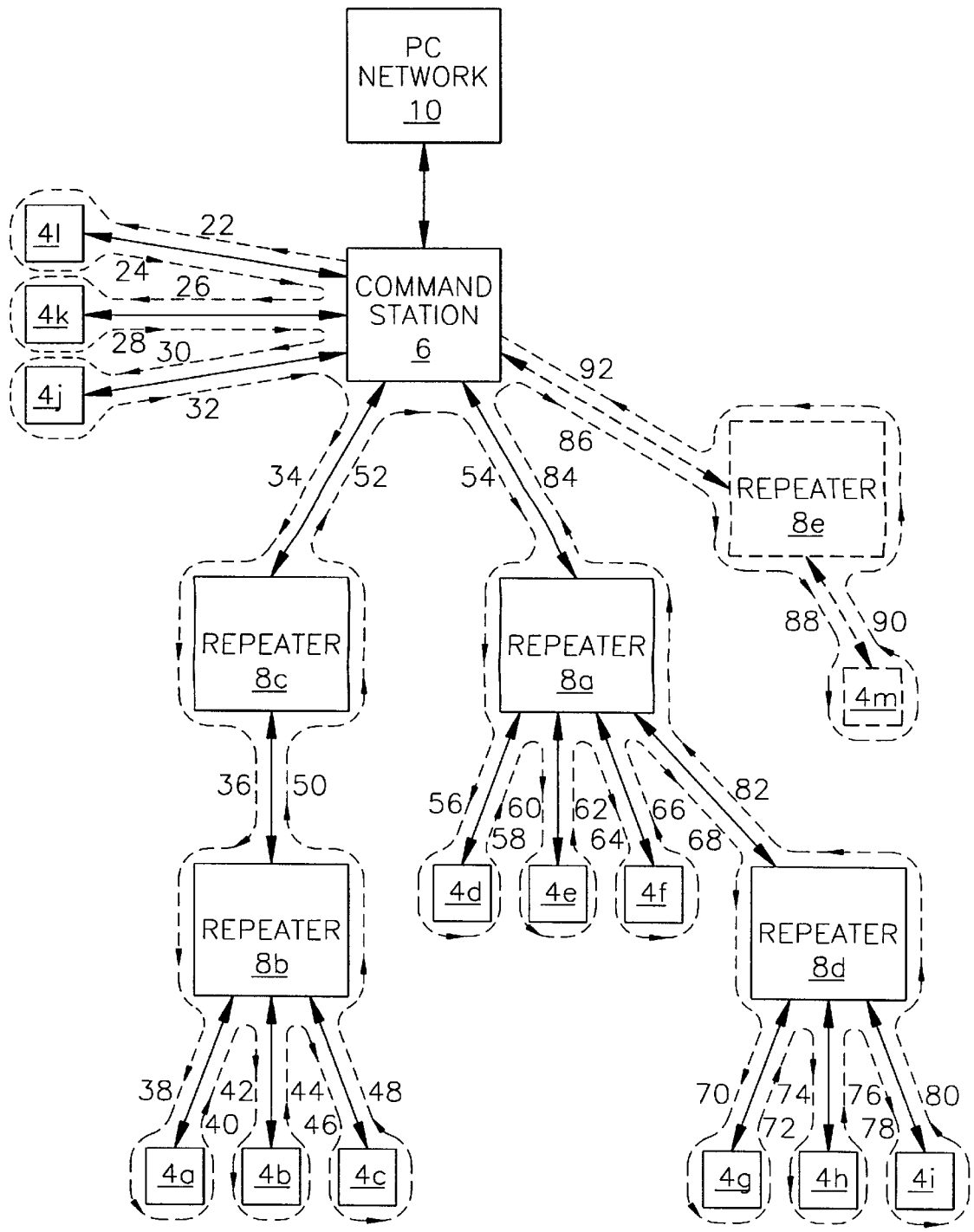
FIG. 8 is functional block diagram of the system of FIG. 1, and illustrating the basic communication signal flow when a time-division communication protocol is employed.
Figure 9:
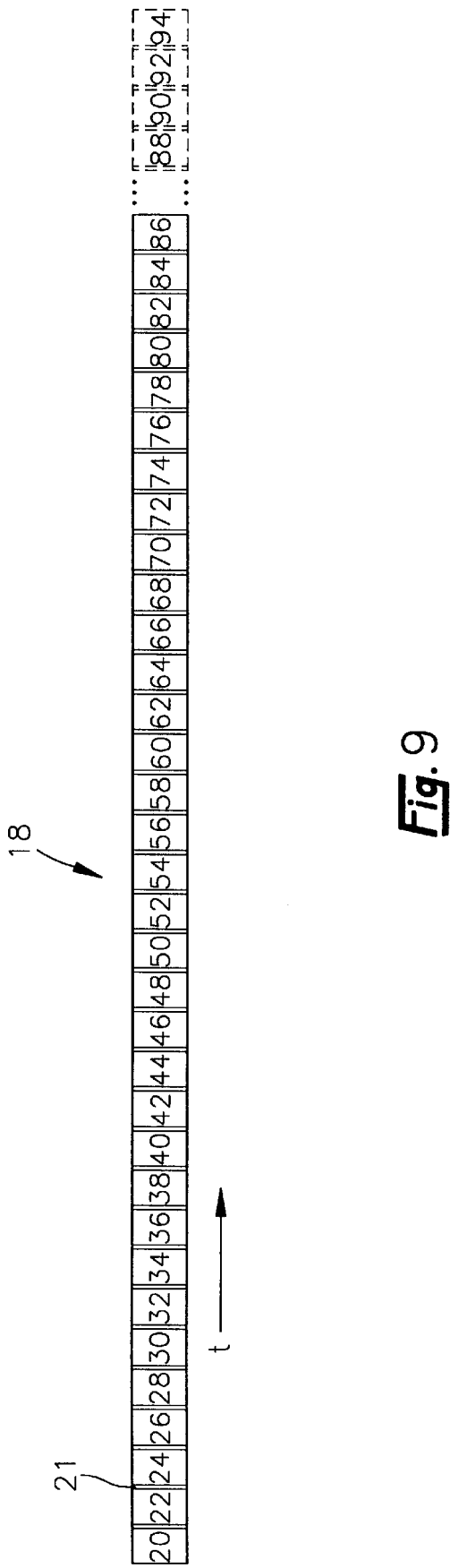
FIG. 9 is a time-division schedule for the time-division communication protocol illustrated in FIG. 8.

FIG. 8 illustrates a typical preferred time-division communication protocol for the system of FIG. 1 (excluding tachometers 5a–c) in accordance with the time slice schedule 18 shown in FIG. 9. During the first time slice 22, the command station 6 transmits a status request to monitor 4l, and monitor 4l responds by transmitting the requested status information to the command station 6 during time slice 24. Preferably, the status request transmitted by the command station 6 will include instructions for which data and which functions the monitor 4l is to perform. Alternatively, the desired data and functions are programmed into the monitor 4l and the status request is simply a request for the monitor 4l to perform functions and transmit data in accordance with its programming. The command and response are transmitted by the command station 6 and monitor 4l a few times to ensure proper transmission and receipt. A small amount of dead time 21 is scheduled between transmission of the command during time slice 22 and transmission of the response during time slice 24 to ensure that the command station 6 and monitor 4l do not transmit at the same time. The quantity of data transmitted (i.e., vibration, temperature, spectral, or other) by the monitor 4l during status polling is preferably kept to a minimum to reduce the length of time required to complete the time slice schedule 18. Following receipt of the response during time slice 24, the command station 6 next addresses monitor 4k and requests its status. The response from monitor 4k is transmitted and received during time slice 26. In similar fashion, each monitor 4 in the system is sequentially requested to provide a status to the command station 6 in accordance with the prearranged time slice schedule 18.

Special requests for data sensing, data analysis, data transmission, and data storage can also be transmitted by the command station 6 to one or more monitors 4. Such special requests are additional to the data and functions provided by monitors 4 during normal status polling. For example, if a particular machine is suspected of having an anomalous condition, it might be useful to instruct that machine's monitors 4 to begin collecting and storing specific types of data for specific types of analysis, such as vibration time waveform data for zoom processing. The monitor computer 418 can also be programmed or otherwise requested to perform the zoom processing itself and store only the results of the zoom processing for later transmission to the command station 6. When transmitted to the command station 6, the data stored in accordance with the special request can be further analyzed or otherwise evaluated to diagnose the suspect machine condition.

The command station 6 can be connected to a PC network 10 as shown in FIG. 8. When so connected, the command station 6 is able to transfer data and information directly to the PC network 10 for analysis and archival storage. The PC network 10 also enables an operator to reformat the time slice schedule 18 of FIG. 9. For example, the time slice schedule 18 can be reformatted by changing the order of devices within the schedule 18, changing the length of time allotted to individual slices, and changing the frequency at which status polls will be conducted. While the above-described time-division methodology can take on many different configurations, some preferences are hereby noted. Generally, each device in the system is assigned a status poll time slice offset (defined during installation or reconfiguration) which represents the time difference (in milliseconds) between the start of the entire status poll sequence and the start of the assigned time slice for that device. Preferably, transmission of a status poll message from a master device (i.e., command station 6 or repeater 8) to another device (repeater, sensor, monitor) takes no more than 4 milliseconds. Thus, all devices must be properly synchronized to ensure that the proper devices will turn on at the proper time. If devices become unsynchronized such that a device listens or transmits before or after an intended receiving device turns on, then communication may break down. Therefore, to ensure proper synchronization each device is resynchronized during every status poll. Each device receives its own status poll message from the command station 6. Sensors, such as tachometers 5a–c respond immediately to the status poll message, typically in less than 4 milliseconds. Repeaters 8 get responses from their assigned sensors and propagate the status poll message to other repeaters 8 on an individual basis.

The command station 6 sends the status poll message first to sensors to which the command station 6 communicates directly with. Next, the command station 6 sends the status poll message to a first repeater branch. When the status poll response comes back from a first branch, the command station 6 sends the status poll message to a second repeater branch, and so on. If the status poll message rolls over a repeater branch and reaches a repeater 8 with a few sub-branches, then the status poll goes over a first sub-branch comes back and goes to a second sub-branch, and so on. When the status poll response goes back to the command station 6 each repeater 8 adds its own response and the responses of all monitors 4 assigned to it.

The time slice scheduling methodology provides for a highly flexible and adaptable system by enabling plant operators to conveniently add, remove, or otherwise rearrange system components. For example, when plant personnel need to add an additional repeater 8e and monitor 4m, the time slice schedule 18 is easily lengthened to accommodate status polling of the new monitor 4m by adding time slices 86–92.

Each monitor 4 and repeater 8 is sent from the factory in a "blank", "unconfigured" condition. In this state, the monitor computer 418 will operate in its standby (low power) mode as previously described. When a small permanent magnet is brought near the reed switch 425, the monitor's receiver turns on for 0.1 seconds. If no messages are received during this 0.1 second time period, the sensor resumes its standby operational mode.

Figure 10:
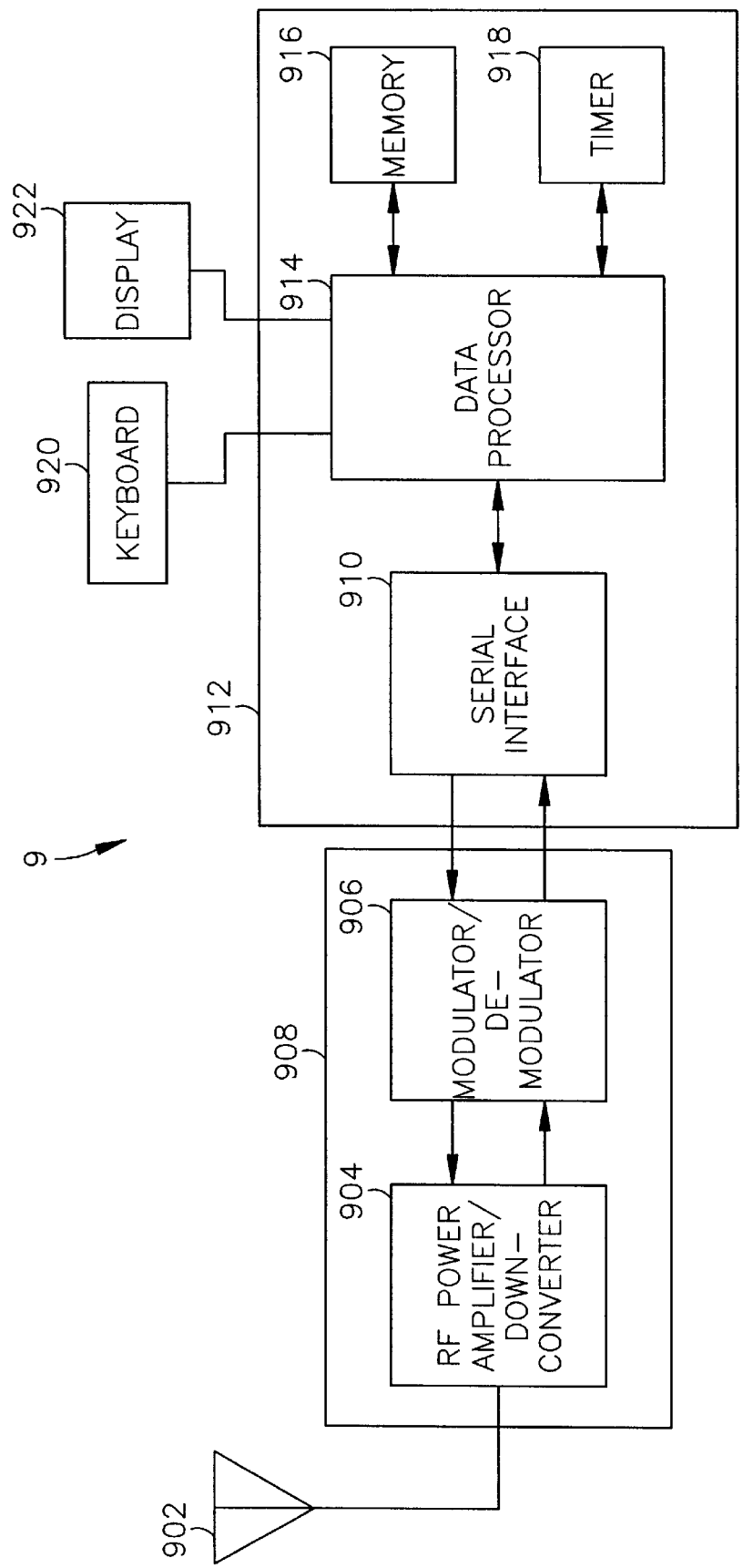
FIG. 10 shows a block diagram of an installation and control unit in accordance with the invention.

During installation and configuration of devices, the user carries an installation and configuration unit, or ICU 9 as illustrated in FIGS. 1 and 10, which in a preferred embodiment consists of a device such as a portable computer modified to accommodate transmission and reception of wireless commands and signals. Alternatively, functions provided by the ICU 9 can be built into the repeaters 8 and monitors 4.

As shown in the block diagram of FIG. 10, the ICU 9 includes an antenna 902 and transceiver 908 which combine to enable transmission and reception of wireless signals. An ICU computer 912 provides control of user interfaces, preferably a keyboard 920 and LCD display 922, for performing installation and configuration. Wireless commands and signals are generated by the processor 914 in accordance with user inputs and processor programming. Commands are then passed over the serial interface 910 of the transceiver where the command is modulated by modulator 906 and amplified by RF power amplifier 904. The modulated command is then transmitted by antenna 902. Incoming wireless signals are received by antenna 902, demodulated by demodulator 906, and passed over the serial interface 910 to the ICU computer 912. Sensor data received by incoming wireless signals is processed by processor 914 and can be stored in memory 916. A timer 918 is utilized to provide the timing needed by the ICU computer 912 for sending and receiving signals. All possible sources of arcing within the ICU 9 are preferably sealed or otherwise accommodated to prevent the ICU 9 from becoming a possible ignition source in hazardous environments.

To install a new device, the user types information into the ICU 9 concerning the installation of the monitor 4 and is requested by the ICU 9 to place the monitor 4 in startup configuration using the permanent magnet. The ICU 9 communicates with the monitor 4 on channel-0 (the configuration channel). As further described below, the ICU 9 enables the user to determine transmitter signal strengths and to assign the monitor 4 to a repeater 8 if necessary. It also enables the user to assign the monitor 4 a normal communication channel and can indicate to the user the signal strength as seen by the command station 6. Alternatively, a single communication channel, or frequency is used for all communication, including configuration and normal communication (e.g., normal status polling and other scheduled communications). In this alternate embodiment, configuration takes place after normal communication is completed if the spread spectrum pseudo-noise (PN) code (as further described below) used for configuration is the same as the PN code used for normal communication. However, a more preferred method of employing single channel communication is to utilize a distinct PN code for configuration and a distinct PN code for normal communication so that configuration can occur during normal communication without interference.

The user can employ the ICU 9 to determine where repeaters 8 must be placed and how to configure (program) them. The user does this by typing the necessary information on the ICU menu through the keyboard 920 and pressing the "configure" button on the repeater 8. This causes the repeater 8 to wake up and listen for configuration commands for 15 seconds. The user then presses the "configure" function key on the ICU keyboard 920, causing the ICU 9 to transmit the configuration parameters on a special, "configuration" communication frequency to the repeater 8. When the repeater 8 receives this command, it will set up its configuration parameters (address, communication parameters, and others) and transmit an acknowledge message back to the ICU 9. Once the address has been set, the repeater 8 changes to the normal communication channel and begins to adjust its transmission strength and the transmission strength of the device from which it receives commands. After this is done, a repeater 8 initiates the process of processing configuration polls. Configuration polls may be issued, for example, every 15 seconds. The purpose of these polls is to enable the ICU 9 to determine and display to the user the communication strength of each repeater 8 and monitor 4. This information is updated on the ICU 9 display every 15 seconds, enabling the user to roam around the plant and install repeaters 8 and monitors 4 where necessary, and thereby install a functioning system. The 15 second configuration polls are routinely transmitted by the command station 6 and function as follows:

Every 15 seconds, the command station 6 transmits a configuration status poll command. Each monitor 4 and repeater 8 powers up its transceivers and transmits a reply sequence based upon its configured poll slice value. After it has received all replies, the command station 6 transmits a composite message to the ICU 9 telling it the results of the status poll. The ICU 9 then updates its display 922 with this information. After the ICU 9 has received the status information from the command station 6 it transmits a reply back to the command station 6, informing the command station 6 of any functions which the user wants it to perform. This enables the ICU 9 to instruct monitors 4 and repeaters 8 (indirectly via the command station 6) to return to the configuration channel for re-configuration or other functions.

The configuration command is transmitted on the configuration channel by the ICU 9 and contains the following information:

(a) device address (b) poll slice value (in milliseconds)

(c) communication channel for normal communications (d) current date/time (e) date/time of first status poll (f) date/time of system startup.

This command is never received by the command station 6, or by monitors 4 and repeaters 8 which are already configured, since it is transmitted on a special configuration channel.

All other configuration commands are processed on the normal communication channel and are transmitted by the command station 6. Although the ICU 9 relays requests for these commands to the command station 6, it is the command station 6 which actually sends the commands to the monitor 4 or repeater 8.

Commands which can be sent by the command station 6 include the following:

(a) Configuration status poll (b) Re-configuration poll command (c) Return to configuration channel for re-configuration (post poll command)

(d) Repeater/monitor deletion (e) Change date/time of system startup (post poll command, the system will start its normal operation at the designated date/time).

The ICU 9 is assigned as a special sensor unit to the command station 6 with an address of −1 and the initial poll slice 20. This initial time slice 20 is reserved for communication with the ICU 9 to tell the command station 6 to switch to configuration mode or to issue some special commands. The ICU 9 can also communicate with each repeater 8. After a particular repeater 8 receives a final response to a status poll 18 from its group of monitors 4, there is a 4 millisecond time slot for the ICU 9 to transmit a short status message to a repeater 8. In an alternate embodiment, the functions of the ICU 9 are built into each monitor 4.

During system setup or when adding new devices to an existing system, devices which communicate directly with the command station 6 are configured first. Each device is separately configured. A Configuration Poll Command is issued by the command station 6 every 15 seconds and the poll results are transmitted to the ICU 9. The ICU 9 also responds to the status polls by transmitting its status directly to the command station 6. The user walks around with the ICU 9. Every 15 seconds, the command station signal strengths are determined by the ICU 9 from the status poll results being transmitted by the command station 6. When the ICU receive signal strength falls below a certain level, the user knows that a repeater 8 (or monitor 4) should be installed and configured. The user then keys in the necessary information and causes the ICU 9 to transmit the configuration information to the device being configured. The ICU 9 commands the device to transmit a signal strength scan using a predefined code. The scan code for each strength level includes unique identifying information. The command station 6 receives the scan signals and, after completion of the scan, transmits the best repeater transmission level to the ICU 9 which then relays it to the device. The device sets its transmitter strength to this level and sends a message to the command station 6 requesting a transmission scan. After the command station 6 completes its transmission scan, the device being configured sends a message to the command station 6 requesting the command station's best transmission level. This request is acknowledged by the command station 6 by transmitting a special entry code which ends the device's configuration if it is a monitor 4. If the device being installed is a repeater 8, it is preferable to temporarily install a few probe sensors in places where monitors 4 will ultimately be installed.

The probe sensors listen to the last transmission scans of the repeater 8 being installed and the command station 6 and transmits the three best signal levels to the ICU 9. The ICU 9 checks whether the probe sensors can receive a good transmission from the repeater 8 being installed and whether they can be assigned to the command station 6. If all probe sensors can receive good transmissions only from the repeater 8 being installed, the ICU 9 transmits a final message to the command station 6 informing it that device installation is complete. In all other cases, both the command station 6 and the device being installed terminate communication with the ICU 9. The user is prompted about his decision on the device arrangement and the user's decision is sent to the command station 6 when it next communicates with the ICU 9.

Devices which do not communicate directly with the command station 6 are installed in similar fashion with the exception that instead of communicating with the command station 6, the ICU 9 communicates with the immediate repeater 8 or other command device of the device being installed. After a new device is configured with its immediate repeater 8, the immediate repeater 8 sends a Unit Configuration Request to the command station 6 (possibly by way other intermediate repeaters 8). After a response is received from the command station 6, the device is configured with the system. All repeaters 8 in the communication chain between the command station 6 and the immediate repeater 8 listen to the command station response and update their monitor/repeater lists accordingly.

When a repeater installation is complete, the ICU 9 responds to the next 15 second poll by transmitting its status and a command to the designated repeater 8, instructing the repeater 8 to inform the command station 6 as to which repeater 8 the ICU 9 is currently communicating through. Subsequent status polls are transmitted via the repeater 8.

All devices are installed in the order of their position in the time slice schedule 18. Installation can be terminated and resumed at any time by transmitting the appropriate signal from the ICU 9 to the command station 6.

At the completion of the installation process, the user initiates system startup from the command station 6. This causes a startup command to be issued, terminates the 15 second polls, and initiates the 60 second polls. In addition, all monitors 4 start their normal data collection functions.

A Re-configuration Poll Command precedes the Configuration Poll Command in an already existing system and when new devices will be assigned a time slice which is not at the end of the time slice schedule 18. In the latter case, a time window for new devices to receive a status poll will be made by adding a time delay to some poll slice values for existing devices. The poll slice values might also be subject to additional changes caused by longer transmissions back to the command station 6.

In the case of an existing system, the command station 6 is informed by the ICU 9 when on-line setup is occurring and all command station activities are stopped, except for the configuration status poll activities, and the command station 6 enters its installation/configuration mode. In the case of a new system, the command station 6 is powered up and set by the ICU 9 for configuration.

During the setup/configuration process, the monitor 4 receives a unique monitor 4 ID number (address), a date/time synchronization by the command station 6 (current time/date), and a date/time of a monitor's first status poll. At the date/time of the first status poll, the monitor 4 will turn on its transceiver and wait to receive a status poll command. If no status poll command is received within 60 seconds, the monitor 4 will go into a "lost synch" loop.

Every time a monitor 4 does not respond to a status poll, the repeaters 8 and the command station 6 record the monitor's status as "not responding" and the date/time the monitor 4 went out of service is logged in a communications journal file by the command station 6. If the monitor 4 returns to service some time later, the date and time of this is also recorded. There are several reasons why a monitor 4 might not respond, including poor communications signal strength, transmission noise, clock error affecting the synchronization of the status poll processing, low battery, hardware failure, removal of monitor 4, and others. If the monitor timer 424 has become unsynchronized with the command station 6, it could be listening for a status poll command at the wrong time. In this case, every minute, the monitor 4 listens for a longer and longer time period so that it can become synchronized. If after 15 minutes the monitor 4 has failed to re-synchronize, then the problem is obviously not due to clock synchronization, but most likely the result of a problem at the command station 6 or a repeater 8 (probably removed from service). In this case, the monitor 4 will begin to process its "lost synch" loop in order to re-establish communications when the problem has been resolved, as follows:

Every 1 minute for the first 10 minutes, the monitor 4 will power up its transceiver 430 for 0.6 seconds at (T=−0.3 seconds) to attempt to receive a status poll.

Every 10 minutes for the first 1 hour, the monitor 4 will power up its transceiver 430 for 6 seconds at (T=−3.0 seconds) to attempt to receive a status poll.

Every one hour for the first 12 hours, the monitor 4 will power up its transceiver 430 for 60 seconds at (T=−30 seconds) to attempt to receive a status poll.

Every 12 hours, the monitor 4 will power up its transceiver 430 for 60 seconds at (T=−30 seconds) to attempt to receive a status poll. This will repeat continuously until the monitor 4 is resynchronized.

During normal communications, the monitor 4 powers up once every 60 seconds. As data is acquired by the monitors 4, it is preferably stored in memory 422 for a period of time. When the monitor 4 transmits an alarm message to the command station 6, the command station 6 may then command the monitor 4 to transmit its most recently stored data. For example, the monitor 4 can be programmed (either at the factory before being shipped, by the ICU 9 during installation or reconfiguration, or through appropriate wireless commands transmitted by the command station 6 before, during, or after installation) to store spectral data for each vibration measurement obtained during the most recent week of measurement activity. When the monitor 4 is in alarm and the command station 6 issues the appropriate command, the monitor 4 transmits all of its spectral data that has been stored over a previous time period, such as the past week. The spectral data can then be further analyzed to help diagnose causal factors which produced the alarm condition.

Although a time-division communication protocol, such as the one described above, is preferably employed to perform status polling of the monitors 4, a non-time division communication protocol can also be employed to perform status polling. Non-time division communication is particularly useful for supplementing data and information obtained during time-division status polling, such as when an alarm condition is signaled during a status poll. For example, when a time-division status poll is completed and a particular monitor 4 has communicated to the command station 6 that an alarm condition exists, the command station 6 will utilize a non-time division communication protocol to command the monitor 4 to transmit its stored data. During non-time division communication, there is no transmission or reception time scheduling. Instead, the command station 6 transmits a command requesting stored data from a particular monitor 4 (or requesting the monitor 4 to perform other functions including status polling). If the communication link between the monitor 4 and command station 6 is by way of one or more repeaters 8, the first repeater 8 in the chain will receive the request for data from the command station 6 and acknowledge such receipt by transmitting an "ACK" signal. The command station 6 receives ACK and waits for data transmission while the first repeater 8 transmits the data request to the monitor 4 or the next repeater 8 in the chain, depending on the system arrangement. In contrast to the methodology employed during time-division communication, all repeaters 8 which are included in the communication chain remain on after the data request has been repeated and wait for the requested data to be transmitted. When the data has been received and retransmitted to the next repeater 8 or command station 6, the repeater 8 turns off.

To illustrate how data is transmitted from a monitor 4 to the command station 6 during non-time division communication, assume that monitor 4c shown in FIG. 8 transmitted an alarm message during a status poll. The communication chain, assuming no blockage of repeaters 8, includes repeaters 8b and 8c. Following the status poll in which monitor 4c indicates an alarm condition, the command station 6 transmits a request for data to repeater 8c, which powers up to listen for command signals at a predetermined time following status polling. Repeater 8c transmits ACK to the command station 6 and repeats or transmits the data request to repeater 8b. Repeater 8c transmits ACK to repeater 8b to acknowledge proper receipt of the data request and transmits the data request to monitor 4c. After repeating the data request, each repeater 8b, 8c remains on in asynchronous fashion and waits for transmission of the requested data. The repeaters 8b, 8c do not turn off until the requested data has been received and retransmitted to the next repeater or to the command station 6.

The command station 6 looks at the results of the status poll responses. When it is discovered that a device did not respond to the status request, the command station 6 will continue normal status polling for 15 minutes to allow time for the lost device to resynchronize. If resynchronization is not successful within 15 minutes, then the cause is probably either a depleted battery or a blocked communication path. In situations where battery depletion is unlikely, the command station 6 assumes that the communication path is blocked and signals the blocked condition to the user. To compensate, the command station 6 selects a group of repeaters 8 and sends them a command to be relayed to the lost device during their time slices. Within this command, the command station 6 requests a transmission strength scan to be performed by the lost device at a specified time Tx. At the specified time, all selected repeaters 8 listen for a fixed amount of time, after which the repeaters 8 send the results of the strength scan to the command station 6. The command station 6 selects one repeater 8 from those which indicated positive results of the strength scan and commands the selected repeater 8 to perform its transmission scan with encoded best transmission strength of the lost device at time Tx+60 seconds. After this scan has completed, the lost device replies to its new repeater 8 and sends its best transmission strength. The new repeater 8 acknowledges the lost device's transmission by informing it that its temporary status poll slice will be the ICU time slot of the new repeater 8. After synchronization of the lost device with the new repeater 8, the command station 6 sends the Re-configuration poll command to make a permanent time slice for the lost device.

In an alternate procedure for compensating for a blocked device, the command station 6 maintains a Re-Configuration Look-Up Table in which a list is maintained for all devices that each repeater 8 can communicate with at any given time. When a device becomes lost due to blocked communication, the command station 6 reassigns the lost device to a new repeater 8.

In addition to power saving features previously described, the monitor 4 also conserves power by transmitting data only during preprogrammed intervals or time slots where the timing of the intervals is provided by the timer 424. Each transmit interval either coincides with the measurement intervals of the sensors 408 so that real-time sensor data is transmitted, or the transmit intervals are scheduled so that data previously stored in the machine monitor memory 422 is transmitted. Transmission scheduling is controlled by the user or operator according to the desired communication protocol programmed into the monitor computer 418. The protocol can be programmed into the monitor computer 418 either before installation or during installation. Protocols can also be installed or changed from the command station 6 after installation, thereby providing the system with the flexibility needed to accommodate system changes such as the addition, removal, or replacement of monitors 4.

Data (including status) and other communication signals are preferably transmitted in a spread spectrum format. In this scheme, a radio-frequency (RF) signal is modulated using a digital coding sequence which spreads the signal energy over a fairly broad bandwidth, thereby making the signal resistant to interference from other nearby RF emitters.

As shown in FIG. 3, a preferred embodiment incorporates a radio frequency (RF) transceiver 430 which performs data transmission as well as data reception. The transceiver 430 of this preferred embodiment further consists of a modulator/demodulator circuit 432, such as the Harris HSP 3824 spread spectrum processor, which, in the transmit mode, modulates a carrier wave (CW) signal with the baseband digital sensor data. The CW signal is fed to an RF power amplifier circuit 434, such as the Hewlett Packard HPMX3003, which amplifies the CW signal into an RF signal to be transmitted from the antenna 406.

The transceiver 430 also provides for receiving and decoding messages from the command station 6 which are transmitted to the machine monitor 4 in the form of RF signals. Such messages include: (1) timing messages which synchronize the machine monitor timer 424 to the command station computer's clock; (2) scheduling messages which tell the machine monitor 4 when, what, and how to measure, analyze, and transmit the sensor data and when to receive other messages from the command station 6; (3) confirmation messages which tell the machine monitor 4 that the command station 6 has accurately received the sensor data transmissions; (4) special request messages which command the machine monitor 4 to perform special data analysis functions (or special data sensing, storage, or transmission); and (5) reprogramming messages which provide new measurement, analysis, and transmission programming for the monitor computer 418. The RF signals from the command station 6 are received by the antenna 406, downconverted to IF by the up-converter/down-converter circuit 434, demodulated by the modulator/demodulator circuit 432 to form baseband data signals, and fed over the serial interface 426 to the data processor 420.

The receive circuits of the machine monitor transceiver 430 are not continuously on, but, to conserve power, are turned on only when necessary to receive messages from the command station 6. The "on time" of the receive circuits is scheduled by the operator according to instructions programmed into the monitor computer 418. At the scheduled times, a message from the timer 424 causes the monitor computer 418 to send power-on messages to the receive circuits of the monitor transceiver 430. The receive circuits stay energized until an error-free message is received from the command station 6, at which time the monitor computer 418 sends a shut-down message to the receive circuits of the monitor transceiver 430.

Figure 4:
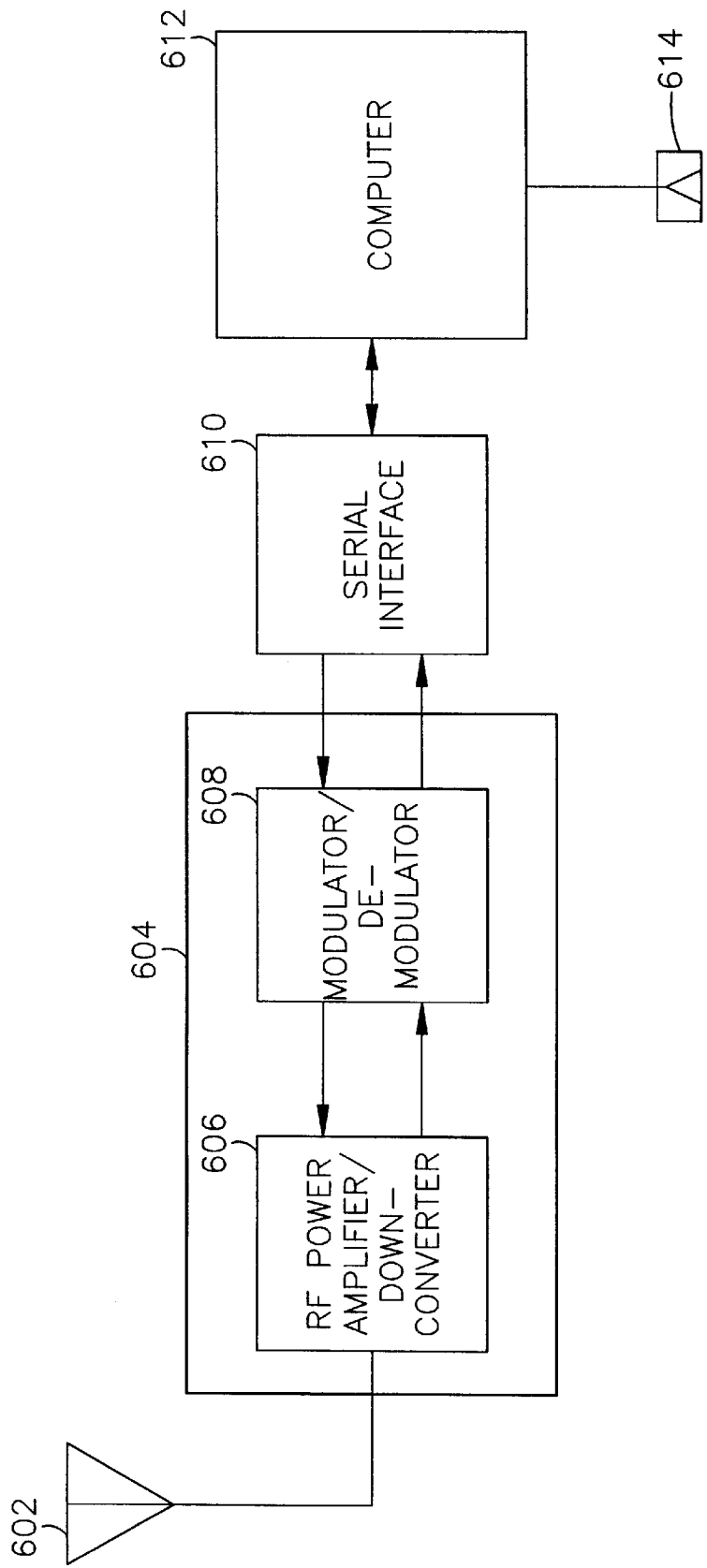
FIG. 4 shows a block diagram of the command station element of a preferred embodiment of the invention.

A block diagram of the command station 6 of FIG. 1 is shown in FIG. 4. The RF signal transmitted from the machine monitor 4 is received by an antenna 602 at the command station 6. A transceiver 604, which includes an RF power amplifier/down-converter circuit 606 and a modulator/demodulator circuit 608, such as those previously discussed in the description of the machine monitor 4, downconverts and demodulates the RF signal to recover the digital sensor data. The sensor data is fed over a serial interface 610 to a command station computer 612, such as a personal computer incorporating a Pentium processor or equivalent, where the information is preferably monitored in real-time for machine fault conditions and is entered into a data base for off-line trend analysis. The transmit circuits of the command station transceiver 604, provide for the transmission of timing, scheduling, and programming messages to the machine monitor 4.

Figure 5:
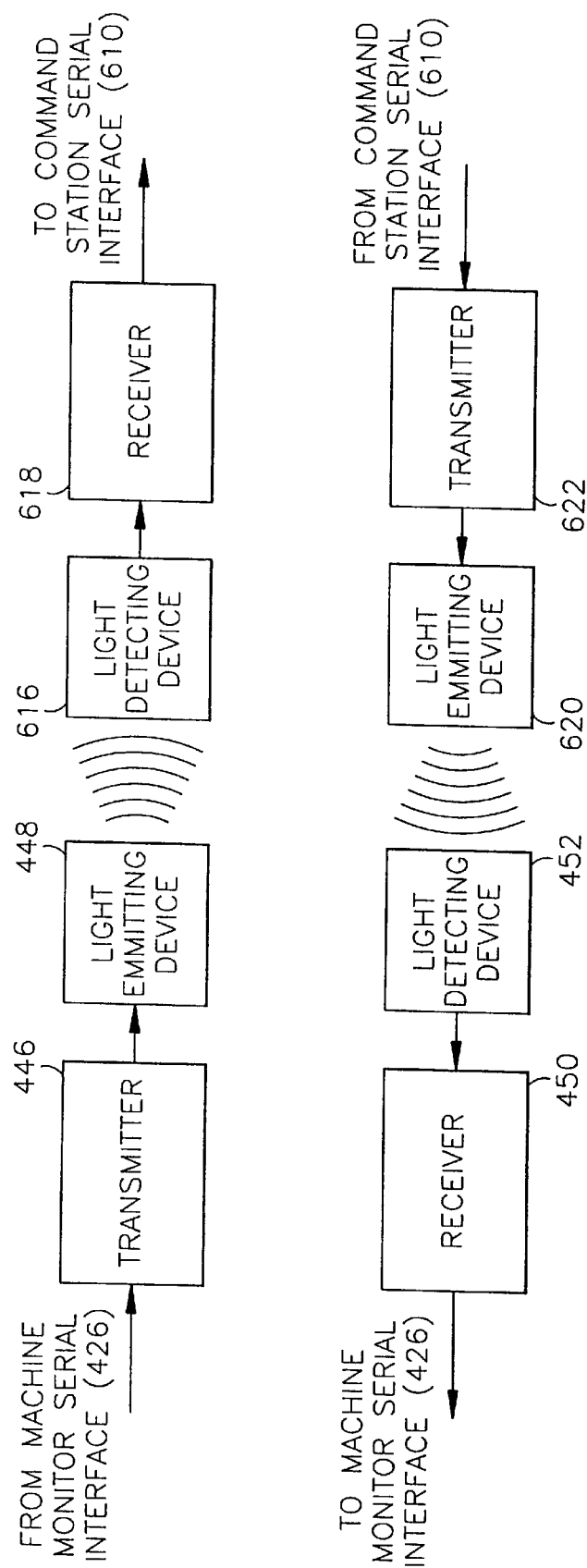
FIG. 5 shows a block diagram of the transmit and receive sections of the machine monitor and the command station of an alternative embodiment of the invention.

In an alternative embodiment of the invention, the machine monitor 4 communicates with the command station 6 by means of light waves. As shown in FIG. 5, the machine monitor transmitter 446 of this embodiment receives digital sensor data from the machine monitor serial interface 426 and modulates an electrical signal which drives a light emitting device 448, such as a light emitting diode (LED). The light emitting device 448 converts the electrical signal from the transmitter 446 into light waves which are modulated with the digital sensor information. At the command station 6 of this embodiment, a light detecting device 616, such as a photodiode, receives the light waves from the light emitting device 448 of the machine monitor 4 and converts the light waves into an electrical signal. With continued reference to FIG. 5, the command station receiver 618 amplifies and demodulates the electrical signal at the output of the light detecting device 616 to form a digital electrical signal which is compatible with the data format of the command station serial interface 610. The sensor data is then passed over the serial interface 610 to the command station computer 612 for processing as described above. A similar series of operations are performed to transmit messages from the command station 6 to the machine monitor 4 as shown in FIG. 5.

A preferred embodiment of the invention provides for error detection in the data that the command station 6 receives from the machine monitor 4. In accordance with a preferred error detection scheme, the machine monitor 4 transmits a 16-bit cyclic redundancy check (CRC16) message immediately after transmitting the sensor data message. Upon receipt of the sensor data message and the CRC16 message, the command station 6 computes its own CRC16 message based on the received data and compares it to the received CRC16 message. If the received and computed CRC16 messages match, then no errors exist in the received sensor data, and the command station 6 transmits an acknowledgment message to the machine monitor 4 to confirm that the sensor data has been accurately received.

To preclude the possibility of a transmission from one machine monitor 4 interfering with a transmission from another machine monitor 4, preferably, data transmission times for each machine monitor 4 are scheduled such that only one machine monitor 4 is transmitting at any given time (time division mutliplexing). By accurate synchronization of the machine monitor timer 424 with the command station clock, the command station 6 "listens" for the transmission of only one machine monitor 4 at the precise time when the command station 6 has commanded the machine monitor 4 to transmit.

To enable the command station 6 to verify which machine monitor 4 is transmitting a data message, each machine monitor 4 transmits a unique identification code prior to the sensor data message. The identification code combined with the sensor data message comprise a data packet. The identification code is stored within the machine monitor 4 by means such as a set of DIP switches or a non-volatile RAM, the state of which determines the value of the identification code to be stored in the monitor computer memory. The identification code transmitted by the machine monitor 4 is received by the command station 6, and the command station computer 612 compares the code to values stored in a table within the command station computer 612.

In an alternative embodiment of the invention, the possibility of interference is reduced further by programming each machine monitor 4 to transmit with its own distinct spread spectrum pseudo-noise (PN) code (code-division multiplexing). The command station 6 then listens for a particular code assigned to a particular machine monitor 4 at the designated transmission time.

Another alternative embodiment of the invention utilizes frequency multiplexing to preclude interference between transmissions from multiple machine monitors 4. In this embodiment, each machine monitor transceiver 430 is assigned a unique frequency band over which to transmit the sensor data to the command station 6. The command station transceiver 604, as commanded by the command station computer 612, listens for a particular machine monitor 4 on the assigned frequency band at the designated transmission time.

While it is preferable to transmit a signal from the machine monitor 4 to the command station 6 only at scheduled times, it is contemplated that the machine monitor 4 could also incorporate means of continuously sensing an extreme fault condition of the machine being monitored, such as the use of tuned reed switches for detecting an extreme vibration condition. When such an extreme fault condition occurs, the monitor computer 418 "wakes up" from the standby mode, processes the signal from its one or more sensors 408, and transmits a data packet consisting of the machine monitor's identification code and the sensor data to the command station 6. To avoid interference with regularly scheduled data messages, these fault messages are transmitted only during special time intervals which are individually assigned to each machine monitor 4 specifically for the transmission of fault messages. Between the time intervals scheduled for "regular" sensor data transmissions, the command station 6 listens for fault messages from the machine monitors 4. Depending on the number of machine monitors 4 under the control of a particular command station 6, several such fault message intervals are available to each machine monitor 4 between the scheduled intervals for "regular" sensor data transmissions.

Figure 6:
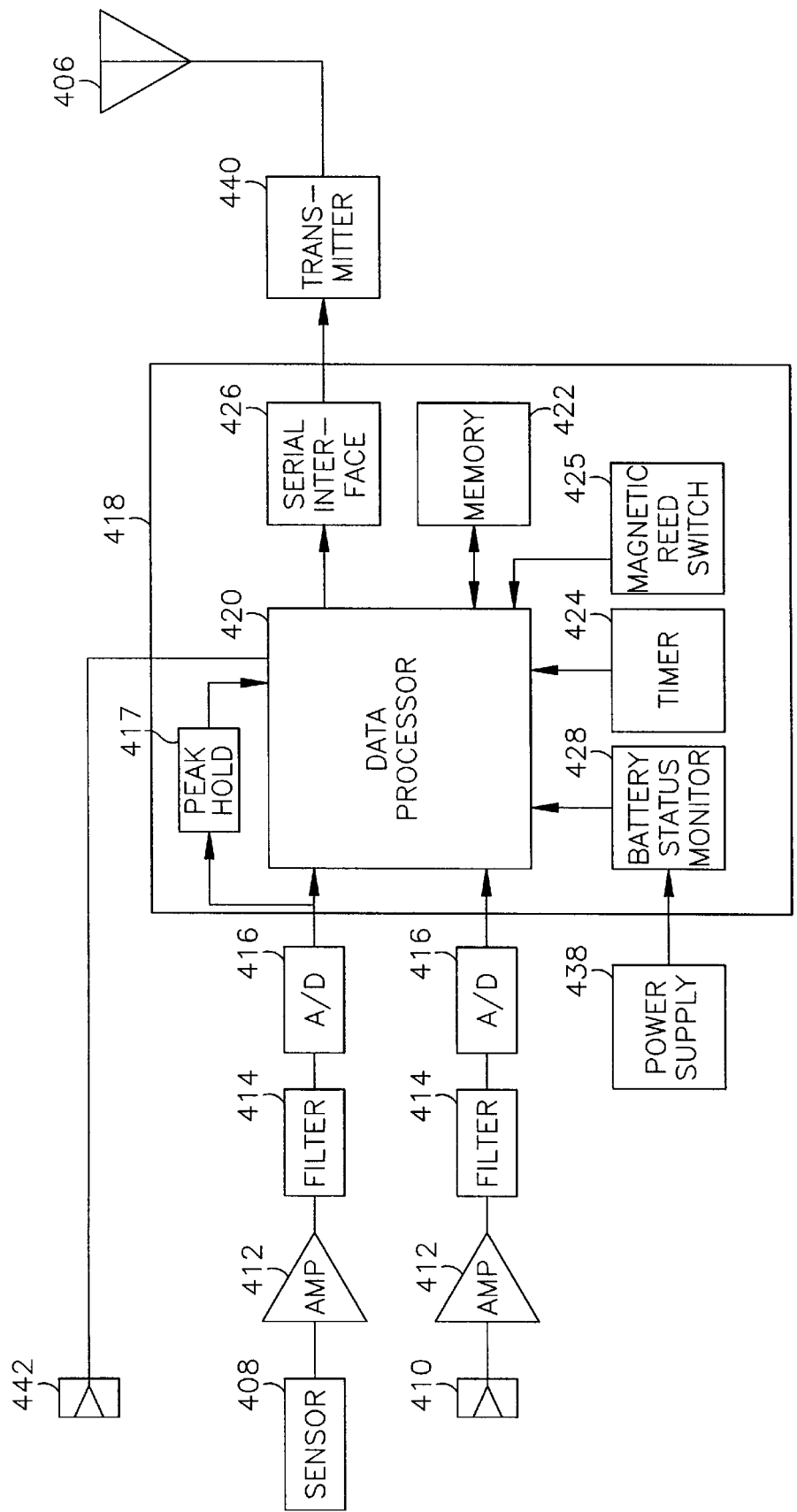
FIG. 6 shows a block diagram of the machine monitor element of an alternative embodiment of the invention.

Although the machine monitor 4 preferably includes means for receiving messages from the command station 6, an important function of the invention, the monitoring and analysis of machine characteristics, can be accomplished without a receiving means included in the machine monitor 4. FIG. 6 is a block diagram of a receiverless machine monitor 4 of an alternative embodiment of the invention. This embodiment includes a transmitter 440, not a transceiver. Instead of receiving wireless messages from the command station 6 to set the machine monitor's start-up and shut-down times, these times are programmed into the monitor computer memory 422 via an interface cable prior to installation of the machine monitor 4 in the machine. During programming, the interface cable is connected between the monitor computer 418 and the command station computer 612, utilizing interface connectors 442 and 614 in the machine monitor 4 and the command station 6, respectively. Synchronization of the machine monitor's timer 424 with the command station's clock is also accomplished via the cable interface. In this alternative embodiment, the data analysis function to be performed by the machine monitor 4 is likewise programmed into the machine monitor computer 418 via the cable interface prior to installation of the machine monitor 4 in the machine to be monitored. Once programming and timing calibration are complete, the interface cable is removed and the machine monitor 4 is attached to the machine.

While the machine monitor 4 is preferably battery powered to accommodate a completely wireless installation in the machine to be monitored, a second alternative embodiment of the invention is useful in those situations which require continuous monitoring of a machine characteristic, and a continuous source of power is available at the machine location. This alternative embodiment incorporates a power conditioner circuit so that the machine monitor 4 may be connected to the AC power source at the machine site. The power conditioner converts the AC source voltage to the appropriate level of DC voltage for each component of the machine monitor 4 and filters the source voltage to remove noise generated on the AC line by nearby machinery.

Figure 7:
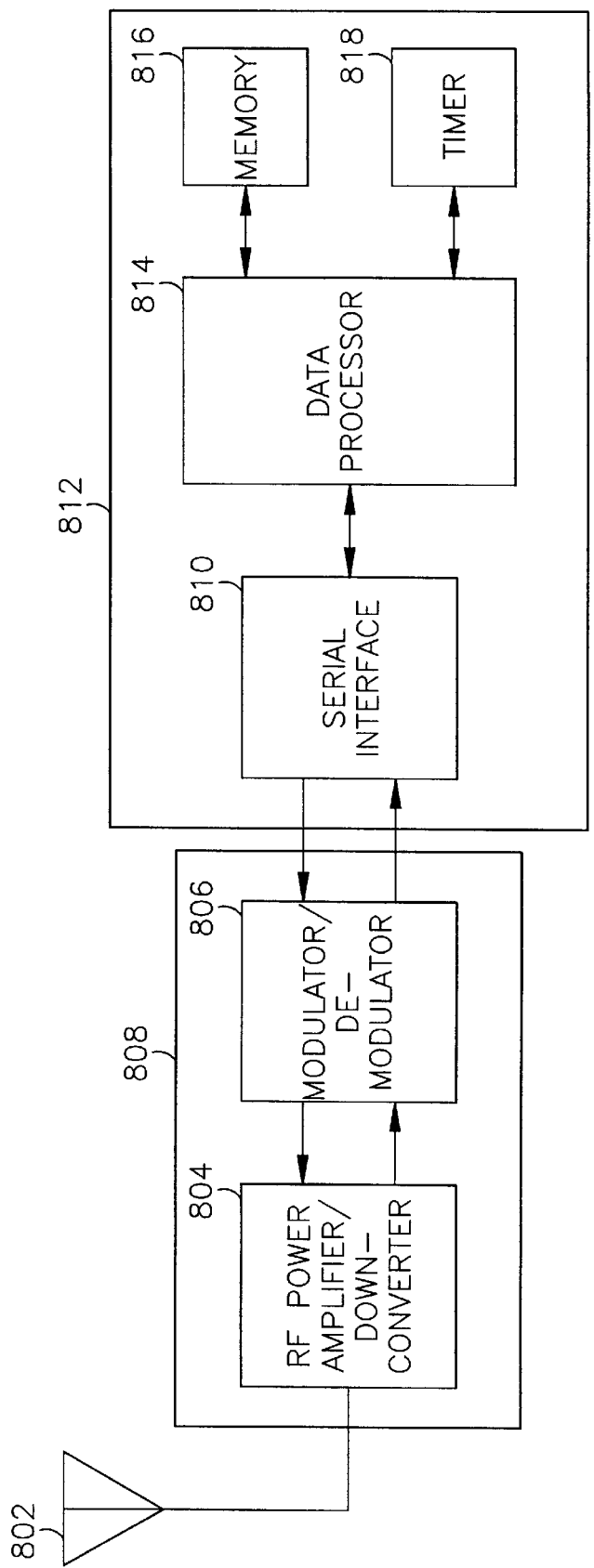
FIG. 7 shows a block diagram of the repeater element of a preferred embodiment of the invention.

The repeater 8 of FIG. 1 is shown in block diagram form in FIG. 7. The RF sensor data message from a machine monitor 4 is received by the antenna 802, converted down to IF by the down-converter circuit 804, and demodulated by the modulator/demodulator circuit 806 to recover the original baseband sensor data. The sensor data is then passed over the serial interface 810 of the repeater computer 812 to the data processor 814. The sensor data is then either stored in memory 816 or is passed to the modulator/demodulator circuit 806 and the RF power amplifier/down-converter circuit 804 of the repeater transceiver 808 to create a "new" RF sensor data signal. This signal is transmitted from the repeater antenna 802 to the command station 6. The repeater 8 operates in a similar fashion when relaying data from the command station 6 to the machine monitors 4.

A timer 818 provides the clock signals necessary for proper timing of the receive and transmit intervals for each machine monitor 4 assigned to the repeater 8. The repeater computer 812 sets up the transceiver 808 with the correct spread-spectrum PN code for the particular machine monitor 4 that the repeater 8 is servicing at any given time.

The repeater's transceiver 808 and computer 812 are of the same type as, or are functionally equivalent to, the corresponding components of the machine monitor 4. In a preferred embodiment, the operation of the repeater 8 is "transparent" to the other components of the system, that is, the other components function in the same manner as they would if the repeater 8 were unnecessary and not in the system.

Since a repeater 8 is designed to service many machine monitors 4, a repeater 8 is typically operable at a higher duty cycle than that of a single machine monitor 4. For this reason, the repeater 8 is preferably continuously powered by a line carrying power to the repeater 8, such as a standard AC power outlet, or by power that is hard wired during installation. Alternatively, the repeater 8 may be battery powered with batteries that have greater storage capacity that those used in the monitors 4. Typically, the location of a repeater 8 is flexible enough to enable the repeater 8 to be hard wired for power, while still adequately servicing the machine monitors 4. For many installations, the ceiling of the facility provides an excellent location for repeaters 8. Continuous operation enables the repeater 8 to be continuously "listening" for fault messages from the machine monitors 4 which the repeater 8 services.

It is contemplated, and will be apparent to those skilled in the art from the foregoing specification, drawings, and examples that modifications and/or changes may be made in the embodiments of the invention. Accordingly, it is expressly intended that the foregoing are only illustrative of preferred embodiments and modes of operation, not limiting thereto, and that the true spirit and scope of the present invention be determined by reference to the appended claims.

What is claimed is:

1. A communication system for monitoring the status of a machine and communicating the machine's status through wireless signals, the system comprising:

a plurality of machine monitors positioned to monitor operational characteristics of a machine, each machine monitor including:

a receiver for receiving wireless signals, including command signals;

at least one sensor for sensing a characteristic of the machine and generating a sensor signal corresponding to the machine characteristic that was sensed;

a data processor for receiving and processing the sensor signals to produce status data and for storing status data;

a transmitter for transmitting wireless status signals corresponding to the status of the machine as represented by status data;

a protocol stored in said data processor;

said data processor for communicating with and controlling said receiver, transmitter, and sensor and for selectively producing power-on and power-off signals for selectively powering said receiver, transmitter, and sensor signal in accordance with said protocol;

an electrical power source and control circuitry responsive to said power-on and power-off signals to selectively power said receiver, transmitter and sensor; and a command station including a transceiver for transmitting wireless command signals and receiving said wireless status signals.

2. The system of claim 1 wherein said protocol is a time-division communication protocol and said plurality of machine monitors are operable to transmit said wireless status signals in accordance with the time-division communication protocol.

3. The system of claim 2 wherein said command station is operable to transmit wireless command signals which include special request messages, said machine monitors being responsive to said special request messages to perform special functions additional to transmitting said wireless status signals in accordance with the time-division communication protocol.

4. The system of claim 3 wherein said special functions include special data sensing and transmission.

5. The system of claim 3 wherein said special functions include special data analysis.

6. The system of claim 3 wherein said special functions include special data storage.

7. The system of claim 3 wherein said special functions include special data transmission.

8. The system of claim 2 wherein said time-division communication protocol is programmed into a machine monitor before installation.

9. The system of claim 2 wherein said time-division communication protocol is programmed into a machine monitor during installation.

10. The system of claim 9, further comprising an installation control unit for programming the machine monitor during installation.

11. The system of claim 2 wherein said time-division communication protocol is programmed into a machine monitor after installation.

12. The system of claim 11, further comprising an installation control unit for programming the machine monitor after installation.

13. The system of claim 2 wherein each of said plurality of machine monitors includes a timer for selectively energizing and de-energizing the monitor in accordance with said time-division communication protocol.

14. The system of claim 13 wherein said command station includes a timer synchronized with machine monitor timers for controlling the transmission of command signals and the receipt of status signals in accordance with said time-division communication protocol, wherein the machine monitor and command station timers are operable to re-synchronize periodically.

15. The system of claim 1 wherein said protocol is a non-time division communication protocol and said wireless status signals are transmitted by said plurality of machine monitors in accordance with the non-time division communication protocol.

16. The system of claim 1 wherein said at least one sensor includes a vibration sensor for sensing vibrations generated by the machine and producing vibration sensor signals, said data processor being operable to receive the vibration sensor signals and produce frequency domain data corresponding to said vibration sensor signals, compare the frequency domain data to predetermined criteria, and determine an alarm condition when the frequency domain data meets the predetermined criteria.

17. The system of claim 16 wherein said data processor performs a Fourier transform on the sensor signals to produce the frequency domain data in the form of a frequency spectrum.

18. The system of claim 16 wherein said data processor stores at least the frequency domain data.

19. The system of claim 18 wherein stored frequency domain data is transmitted by a monitor in accordance with a non-time-division, asynchronous communication protocol when an alarm condition is present.

20. The system of claim 1 wherein said at least one sensor further includes a tachometer sensor positioned to sense machine revolutions and produce corresponding tachometer signals, said tachometer sensor including a transmitter for transmitting a wireless tachometer signal corresponding to sensed machine revolution information, at least one monitor being operable to receive the wireless tachometer signals.

21. The system of claim 20 wherein one or more of said plurality of machine monitors is operable to selectively energize and de-energize in accordance with machine revolution information contained in said tachometer signals.

22. The system of claim 20 wherein said tachometer signals correspond to whether the machine is on or off.

23. The system of claim 20 wherein said tachometer signals comprise a time series of electrical pulses where each pulse corresponds to the beginning of a machine revolution.

24. The system of claim 1, further comprising one or more repeaters for receiving and re-transmitting said wireless signals for receipt by another repeater, monitor, or the command station.

25. The system of claim 1, further comprising a computer network connected to said command station for transferring data and controlling wireless communication within the system.

26. The system of claim 1 wherein said transmitter includes a spread spectrum transmitter and said receiver includes a spread spectrum receiver, each said transmitter and receiver using spread spectrum communication techniques to avoid interference from other radio frequency emitters, said spread spectrum techniques including the use of a first PN code for communicating according to a first spectrum spreading sequence.

27. The system of claim 26, further comprising an installation control unit for configuring a machine monitor, said installation control unit comprising:

a wireless installation control unit transmitter and receiver using spread spectrum communication techniques including the use of a second PN code that is different than said first PN code;

an installation control unit data processor for controlling and causing the installation control unit transmitter to transmit configuration signals to said monitor for reprogramming of the monitor data processor and for processing wireless signals transmitted by the monitor; and a user interface for inputting user commands to the installation control unit data processor to control reprogramming of machine monitors.

28. A wireless machine monitoring system comprising:

a plurality of machine monitors, each monitor having at least:
- a) one sensor for sensing a parameter of the machine and producing digital data corresponding thereto;
- b) a wireless monitor transmitter and receiver; and
- c) a monitor data processor for controlling the operation of the sensor, transmitter and receiver, for receiving and processing the digital data according to a first processing configuration, for communicating the digital data to the transmitter and causing the transmitter to produce transmission signals corresponding to the digital data;

a command station having at least:
- a) a command station receiver and associated circuitry for producing received digital data; and
- b) a command station data processor for controlling and causing the receiver and associated circuitry to receive a transmission signal and produce received digital data corresponding to the transmission signal, said command station data processor being operable to store said received digital data; and means for reprogramming the monitor data processor to change the programmed processing configuration to reconfigure the machine monitor to process the data according to a second processing configuration.

29. The system of claim 28 wherein said means for reprogramming includes a hand-held configuration device comprising:

a wireless configuration device transmitter and receiver;

a configuration device data processor for controlling and causing the transmitter to transmit configuration signals to said monitor for reprogramming of the monitor data processor and for processing wireless signals transmitted by the monitor; and a user interface for inputting user commands to the configuration device data processor to control reprogramming of machine monitors.

30. The system of claim 29 wherein the transmitters and receivers of said plurality of machine monitors and said configuration device utilize spread spectrum communication techniques including the use of PN code sequencing to define a spectrum spreading sequence.

31. The system of claim 30 wherein the PN code used for communication between a monitor and the command station is different than the PN code used for communication between a monitor and the configuration device.

32. The system of claim 28 wherein said means for reprogramming is disposed in said command station.

33. A method of determining and communicating the status of a machine, the method comprising the steps of:

programming a plurality of machine monitors in accordance with a communication protocol;

transmitting wireless command signals from a command station to said plurality of machine monitors in accordance with the communication protocol, said command station and machine monitors comprising a machine monitoring and communication system;

sensing a characteristic of the machine being monitored in accordance with said command signals to produce sensor signals;

processing the sensor signals to produce machine status data; and transmitting wireless status signals representing status data to the command station in accordance with the time-division communication protocol.

34. The method of claim 33, further comprising the step of transmitting special request messages from the command station to a machine monitor to command the machine monitor to perform special functions additional to those provided in accordance with the communication protocol.

35. The method of claim 34 wherein said special functions include special data sensing and transmission.

36. The method of claim 34 wherein said special functions include special data analysis.

37. The method of claim 34 wherein said special functions include special data storage.

38. The method of claim 34 wherein said special functions include special data transmission.

39. The method of claim 33 wherein said communication protocol is a time-division communication protocol.

40. The method of claim 33 wherein said communication protocol is a non-time division communication protocol.

41. The method of claim 33 wherein a machine monitor is programmed with the communication protocol before installation.

42. The method of claim 33 wherein a machine monitor is programmed with the communication protocol during installation.

43. The method of claim 33 wherein a machine monitor is programmed with the communication protocol after installation.

44. The method of claim 33, further comprising the step of propagating wireless command and status signals with a repeater positioned intermediate a monitor and the command station.

45. The method of claim 33 wherein said processing step includes the steps of:

producing frequency domain data from said sensor signals;

comparing the frequency domain data to predetermined criteria; and determining an alarm condition that is transmitted with the status signals when the frequency domain data meets the predetermined criteria.

46. The method of claim 45, further comprising the steps of:

storing frequency domain data over time; and transmitting stored frequency domain data in accordance with a non-time-division, asynchronous communication protocol when an alarm condition is present.

47. The method of claim 46, further comprising the step of analyzing frequency domain data to determine the cause of the alarm condition.

48. The method of claim 33 wherein each of said plurality of machine monitors power up to receive wireless command signals, sense machine characteristics, and transmit wireless status signals only during designated periods of time as defined by a time-division communication protocol, wherein each designated period of time comprises a time slice within the time-division communication protocol.

49. The method of claim 48, further comprising the step of modifying the time-division communication protocol to accommodate changes to the communication system.

50. The method of claim 49 wherein said modifying step includes adding one or more time slices.

51. The method of claim 49 wherein said modifying step includes deleting one or more time slices.

52. The method of claim 49 wherein said modifying step includes rearranging existing time slices.

53. The method of claim 33 wherein said characteristic being sensed is vibration.

54. The method of claim 33 wherein said characteristic being sensed is speed.

55. A method of periodically polling a plurality of machine monitors for machine status data in accordance with an established communication protocol, said method comprising the steps of:

defining a time-division schedule of events to occur during a periodic polling sequence, said events including:

transmitting wireless command signals from a command station to other communication devices including machine monitors;

receiving wireless command signals by said machine monitors;

sensing one or more characteristics of the machine to produce sensor signals;

processing said sensor signals to produce machine status signals; and transmitting wireless status signals to the command station;

assigning each communication device a time slice within the time-division schedule during which the device powers up to receive and execute commands communicated by the command signals; and polling machine monitors in accordance with said time-division schedule to determine the status of the machine.

56. The method of claim 55, further comprising the steps of determining when a particular machine monitor does not communicate with the command station in accordance with the time-division schedule, and executing a communication procedure for re-establishing communication with the particular machine monitor.

57. The method of claim 56 wherein said executing step includes the step of periodically powering up the particular machine monitor for increasingly longer time periods to listen for polling commands.

58. The method of claim 56 wherein said executing step includes:

continuing to periodically poll machine monitors in accordance with the time-division schedule during a first predetermined time period;

if communication with the particular machine monitor is not re-established within the first predetermined time period, selecting one or more repeaters to relay a command requesting the particular machine monitor to perform a transmission strength scan at a first designated time;

listening during a second predetermined time period for signals transmitted by the particular machine monitor during the commanded transmission strength scan;

processing transmission strength scan signals received by the selected repeaters to determine a most favorable repeater and transmission strength scan;

commanding the particular machine monitor to perform a transmission scan at the most favorable transmission strength at a second designated time that is later than the first designated time;

acknowledging proper receipt of the particular machine monitor's transmission scan by assigning the particular machine monitor a temporary time slice within the time-division schedule; and reconfiguring the time-division schedule to assign the particular machine monitor a permanent time slice once synchronization with the most favorable repeater is established.

\* \* \* \* \*